UNITED STATES PATENT OFFICE.

HELON B. MacFARLAND, OF CHICAGO, ILLINOIS, AND ROBERT J. SHOEMAKER, OF TOPEKA, KANSAS; SAID SHOEMAKER ASSIGNOR TO SAID MacFARLAND.

METHOD OF PRODUCING INSULATING MATERIAL.

1,146,190.  Specification of Letters Patent.  Patented July 13, 1915.

No Drawing.  Application filed November 26, 1913. Serial No. 803,208.

*To all whom it may concern:*

Be it known that we, HELON B. MACFARLAND and ROBERT J. SHOEMAKER, citizens of the United States, residing at Chicago, in the county of Cook and State of Illinois, and Topeka, in the county of Shawnee and State of Kansas, respectively, have invented certain new and useful Improvements in the Method of Producing Insulating Material, of which the following is a specification.

Our invention relates to the production of a fibrous material suitable for use particularly as a heat insulator although susceptible of being used in other analogous situations.
The principal objects of the invention are: first, to provide an insulating material in the form of a relatively thin sheet or board adapted, for example, to be placed in the walls of a building or other like structure, which will be tough and tenacious in its character so that it will not be readily torn, pliable in order that it may not be easily broken in handling or by vibration of the structure with which it is used, or other like causes, and at the same time sufficiently cellular or felt-like to make a good insulator, and which, furthermore, will be of such composition and texture that when it is rolled out or otherwise pressed or formed into sheets, these sheets will be of uniform thickness and density; and, second, to utilize, for the production of such insulating sheets or boards, a raw material which is plentifully supplied by nature, and because not used to any extent in the arts has little or no commercial value, and which, furthermore, can be converted into the desired condition and form by methods that are simple, expeditious and inexpensive.
The invention contemplates using as a raw material certain sea plants, specifically the plant commonly called eel grass (*Zostera marina* of the botanical family of *Naiadaceæ*).
This application is filed to cover the method of producing the insulating material. The product itself is not claimed herein as it forms the subject matter of a copending application filed by us of even date herewith and bearing Serial No. 803,207.

The method in question, in its preferred form, is as follows: The raw material, the eel grass, is first cooked or boiled in an alkaline solution—preferably a two per cent.
solution of caustic soda—for a period of from one to six hours. The boiling may be done either at atmospheric pressure or under steam pressure. This treatment frees and dissolves out from the fibrous or cellular constituent of the plant, a portion of the pectic, resinous and nitrogenous matters. These last mentioned substances are thereupon removed by any suitable treatment, for example, by suspending the material in large volume of water and agitating the same either mechanically or by means of compressed air. The product in this condition lacks the toughness, stability and closeness of texture which it is desirable that a sheet of insulating material should have when employed in the situations above noted. In order to give the product these qualities, our invention contemplates subjecting it to further treatment as follows: A portion of the material derived from the alkaline treatment above described is immersed in an acid bath. Any suitable acid may be used. Preferably we employ a very dilute sulfuric acid, the material being suspended in this acid for a short time, say from five to fifteen minutes.

Although the precise chemical reactions taking place when the acid comes into contact with the material cannot be stated with absolute accuracy, due to the complex chemical character of the material, the acid apparently dissolves out the residue of the pectic, resinous and nitrogenous matter not removed by the alkaline treatment, frees the cellulose constituent from a large part of the insoluble mineral and other substances, by changing such substances into soluble compounds, and converts the cellulose into hydro-cellulose in the sense of the following formula:

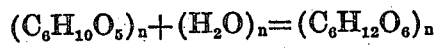

$$(C_6H_{10}O_5)_n + (H_2O)_n = (C_6H_{12}O_6)_n$$

After the acid treatment the material is again washed with water to remove the acid and soluble substances. In physical structure the resultant material is a more or less gummy or gelatinous mass but still somewhat fibrous in character. If this material is rolled out into sheets, it will be found to be somewhat more brittle and more dense than is desirable, and to obtain a product which will have all the desired qualities we mix a certain amount of the material subjected to the acid treatment, as above described, with material which has been treated only with the alkali. For example, a very excellent compound is obtained by mixing together, while both constituents are wet, seventy per cent. of the material treated with the alkali and thirty per cent. of the material treated first with the alkali and then with the acid. The mixing is advantageously carried on by suspending both constituents in a large volume of water and agitating by compressed air, or mechanically, from one to six hours until the mixture is perfectly homogeneous. The water is then drained off and the material rolled into sheets of the desired thickness. The character of the product is such that the sheets will be uniform in thickness, homogeneous in texture, besides being both very tough and very pliable. The material is not liable to decomposition by heat or water. A heat insulating material to be effective and durable should have all of these qualities.

While a material composed as last described best exemplifies our invention, it is possible to obtain a useful product by mixing with raw eel grass the substance obtained from this plant by treating the same first with an alkali and then with an acid as described above. In other words, it is possible to substitute the raw material for the material boiled in the alkaline solution.

While we prefer to use for the production of our insulating product the particular marine plant referred to, it is realized that our invention might be utilized for the production of a product, which would have some if not all of the advantageous features of the compound described, employing as a raw material other marine plants than the *Zostera marina*, or other vegetable matter of a generally similar character.

One of the difficulties in utilizing marine plants for the production of boards or sheets suitable for insulating purposes is due to the difficulty of removing the mineral salts which such plants contain in excess because of the nature of their habitat. Our method successfully accomplishes this result thereby making it possible to obtain a material which satisfies the several requirements of a conveniently handled and effective heat insulating compound. Furthermore, we do not wish to be understood as limiting the invention to the particular agents and their proportions above described, or to other details of the process susceptible of being modified without departure from the principles thereof. For example, the washing following immediately after the alkali treatment might be omitted when the material is subsequently mixed with the acid treated material by suspension and agitation as described.

While the method of our invention is particularly useful for the production of a heat insulating material for refrigerating plants, ice-houses, refrigerator cars, steel passenger cars, and the like, it will be obvious that it might be made use of for the production of a material of like character but intended for other purposes. For instance, by suitably treating the sheets the material might be used for fireproofing purposes or for waterproofing. The material might also be advantageously used for deadening sound.

We claim:

1. The method of producing an insulating material from the plant *Zostera marina*, which consists in cooking the plants in an alkaline solution, removing the soluble substances, converting the fibrous residue into a gummy substance by treatment with an acid and mixing the same with vegetable fibers.

2. The method of producing an insulating material from the plant *Zostera marina*, which consists in cooking the plants in an alkaline solution, removing the soluble substances, converting the fibrous residue into a gummy substance by treatment with an acid and mixing the same with fibers derived from plants of this species.

3. The method of producing an insulating material from the plant *Zostera marina*, which consists in cooking the plants in an alkaline solution, removing the soluble substances, converting the fibrous residue into a gummy substance by treatment with an acid and mixing the same with fibers derived from plants of this species freed in part of the non-fibrous constituent of the plant.

4. The method of producing an insulating material from marine plants which consists in cooking the plants in an alkaline solution, subjecting the same to an acid treatment to render the cellulose constituent gummy in its consistency, removing the substances dissolved out by said alkaline and acid treatments, and mixing said gummy substance with the fibers of the plant which have been previously given an alkaline treatment.

5. The method of producing an insulating material from marine plants which consists in cooking the plants in an alkaline solution, subjecting the same to an acid treatment to render the cellulose constituent gummy in its consistency, removing the substances dissolved out by said alkaline and acid treatments, suspending the residue in water with a fibrous material produced by treating the plants with the alkaline treatment, agitating the mixture, then draining and pressing it to the desired form.

6. The method of producing an insulating material from marine plants which consists in cooking the plants in an alkaline solution, subjecting the same to an acid treatment to render the cellulose constituent gummy in its consistency, removing the substances dissolved out by said alkaline and acid treatments, suspending the residue in water with a fibrous material, agitating the mixture, and then draining and pressing it to the desired form.

7. The method of producing an insulating material from marine plants which comprises dissolving out the non-cellular constituent from the cellulose and converting the cellulose into hydro-cellulose, and mixing the resultant substance with cellulose structures obtained from said plant freed from the non-cellulose constituent thereof.

8. The method of producing an insulating material from vegetable matter which consists in dissolving out the non-cellular constituent from the cellulose, converting the cellulose into hydro-cellulose, and mixing the hydro-cellulose with cellulose structures freed from the non-cellular constituent of said matter.

9. The method of producing an insulating material from Zostera marina which consists in cooking the raw material in an alkaline solution, recovering the cellulose, immersing a portion of said cellulose in an acid bath, mixing the resultant material with the material treated only with the alkali, and pressing the mixed product into a sheet.

10. The method of producing an insulating material from Zostera marina which consists in cooking the raw material in an alkaline solution, recovering the cellulose, immersing a portion of said cellulose in an acid bath, mixing the resultant material with a material treated only with the alkali in the proportion of substantially thirty per cent. of the acid treated material to seventy per cent. of the material treated with the alkali alone, and pressing the mixed product into a sheet.

11. The method of producing an insulating material from vegetable matter which consists in cooking the raw material in an alkaline solution, recovering the cellulose, immersing a portion of said cellulose in an acid bath, mixing the resultant material with the material treated only with the alkali, and pressing the mixed product into a sheet.

HELON B. MacFARLAND.
ROBERT J. SHOEMAKER.

Witnesses:
L. A. FALKENBERG,
H. M. GILLESPIE.